United States Patent Office 3,434,271
Patented Mar. 25, 1969

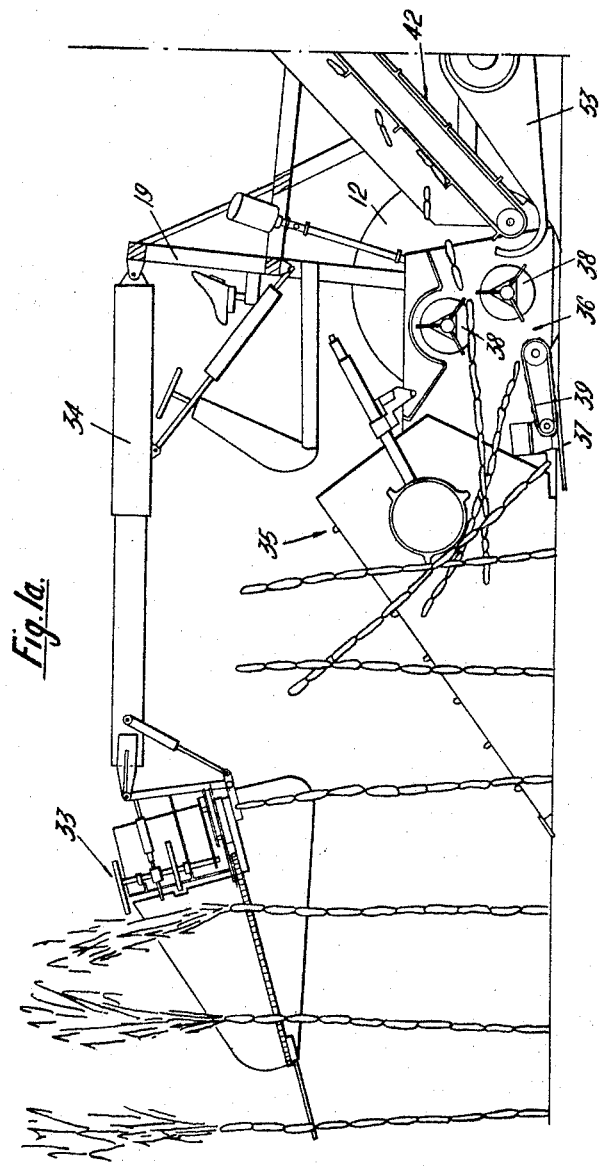

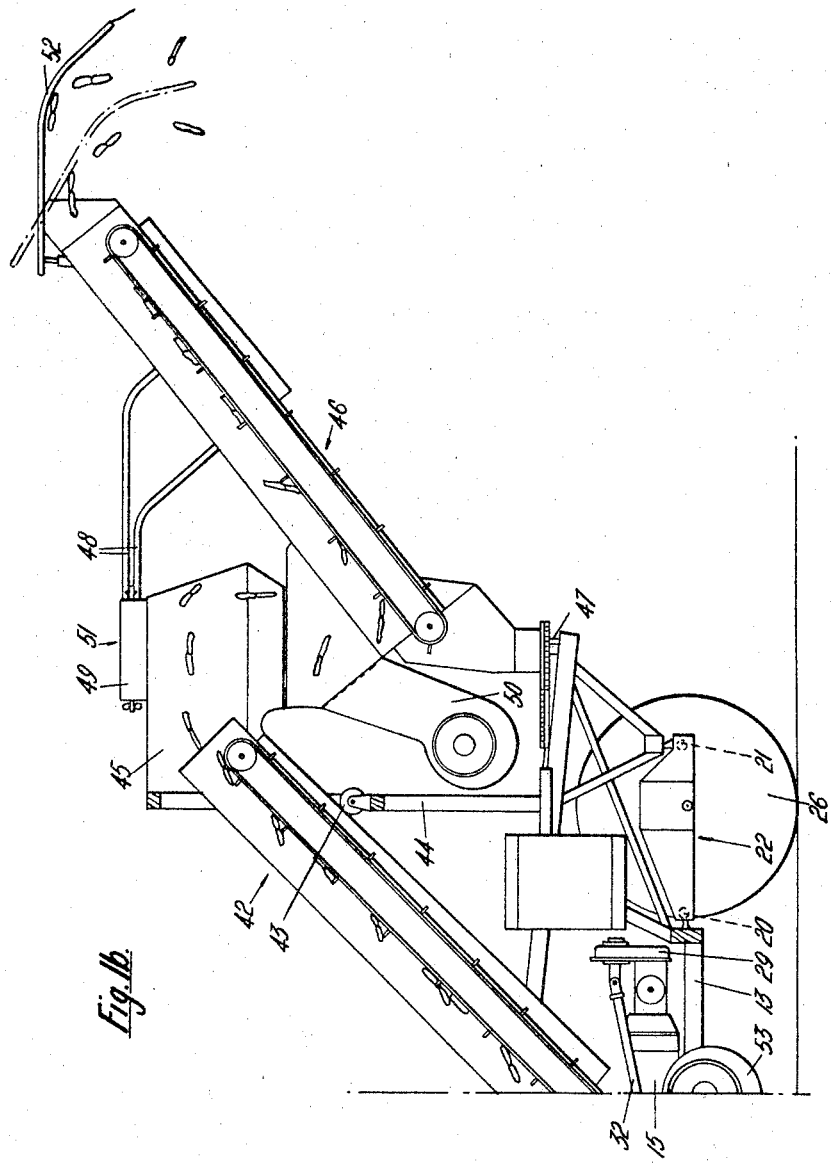

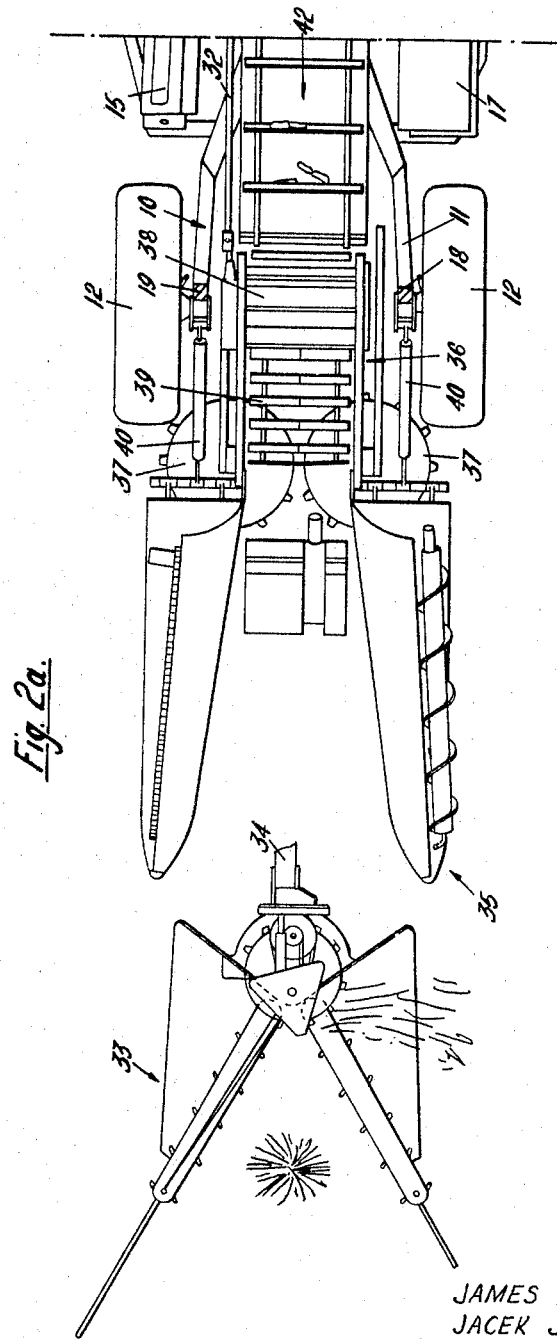

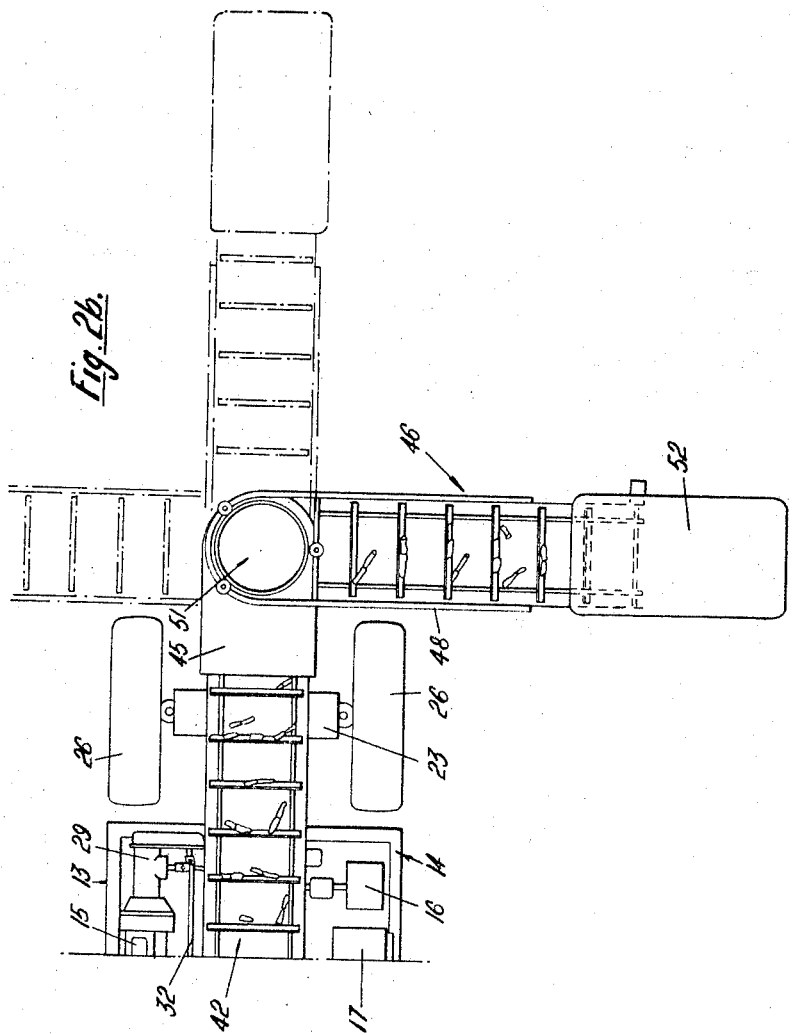

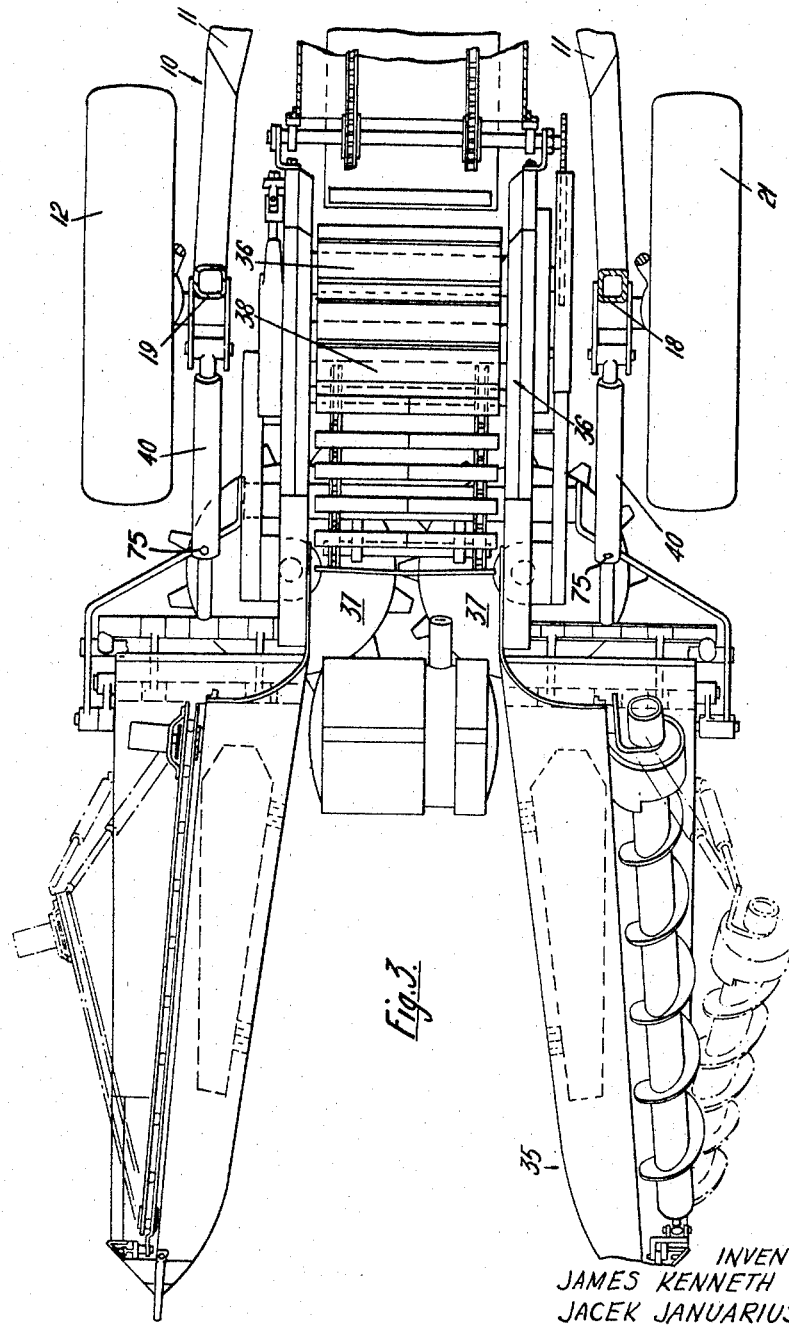

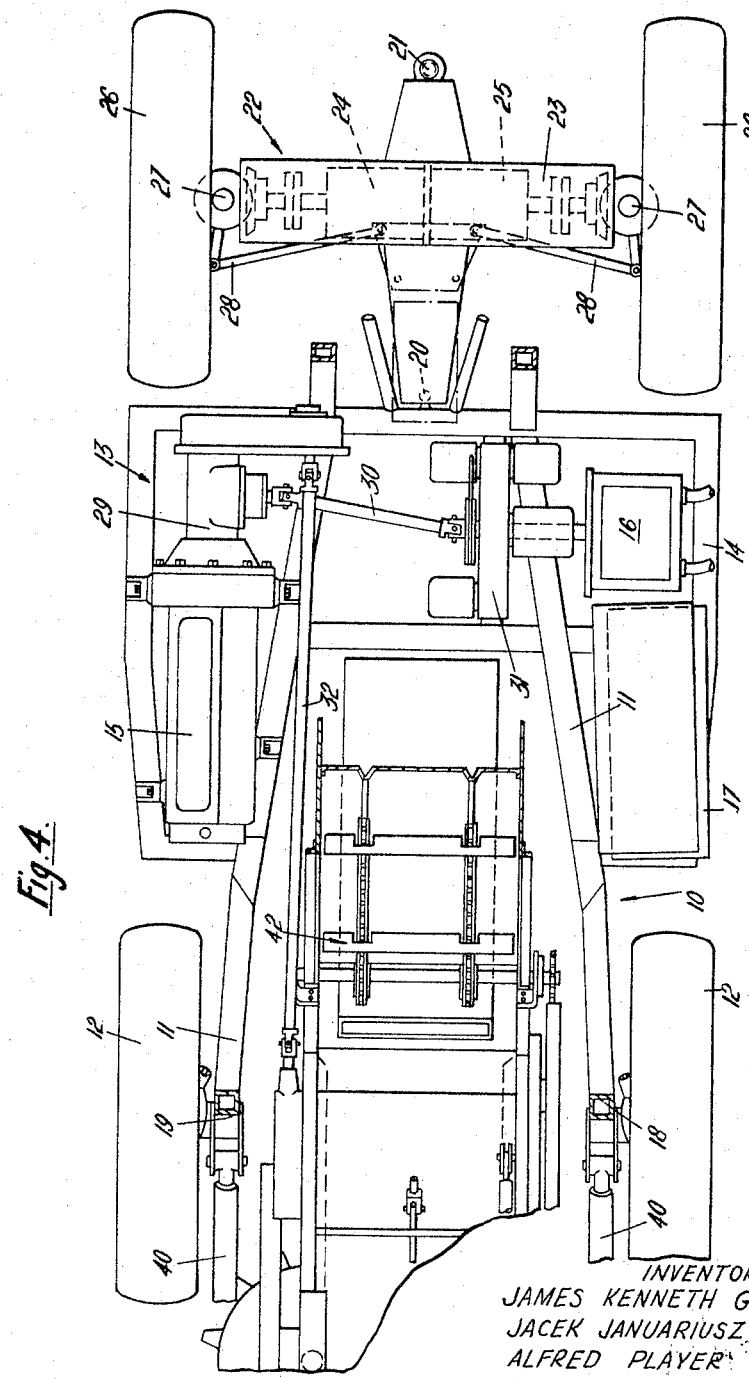

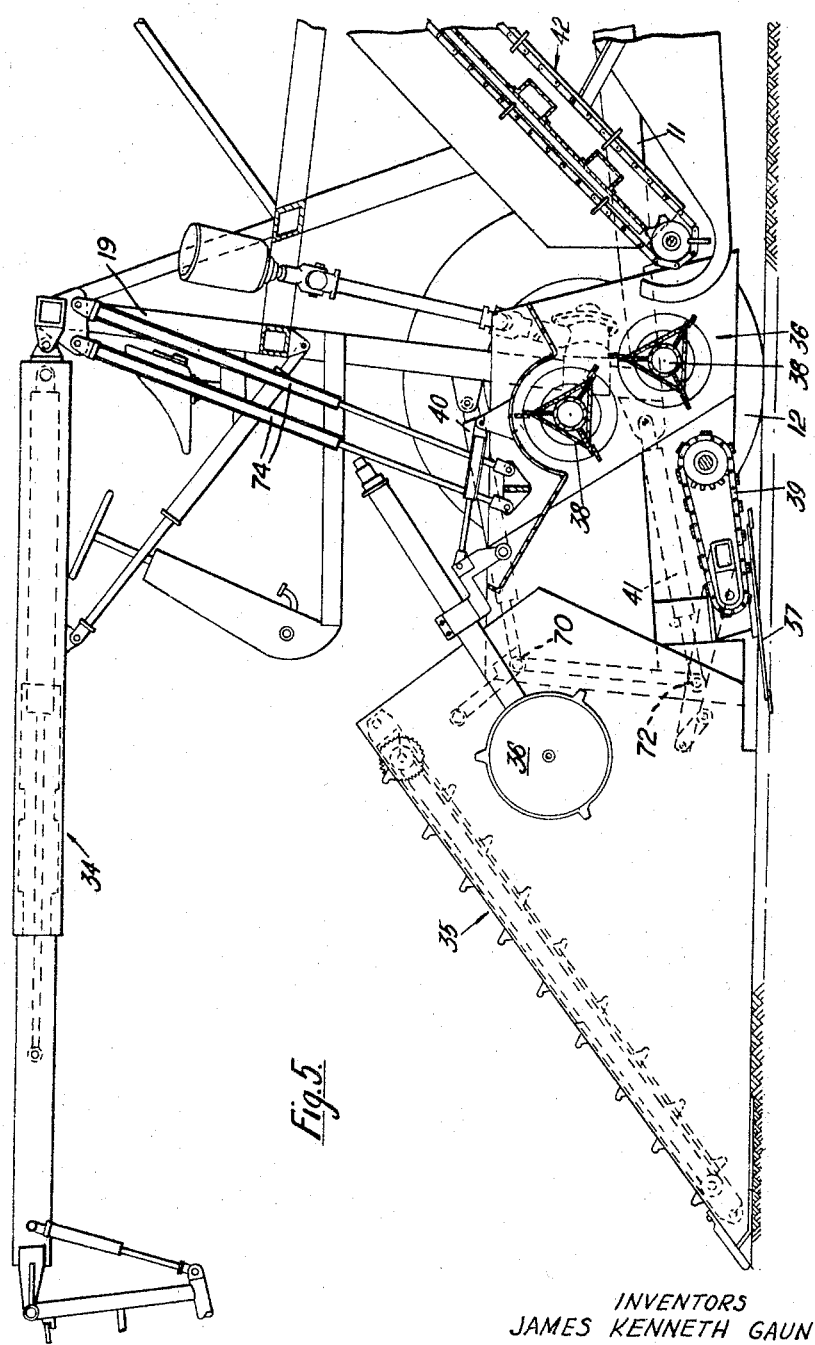

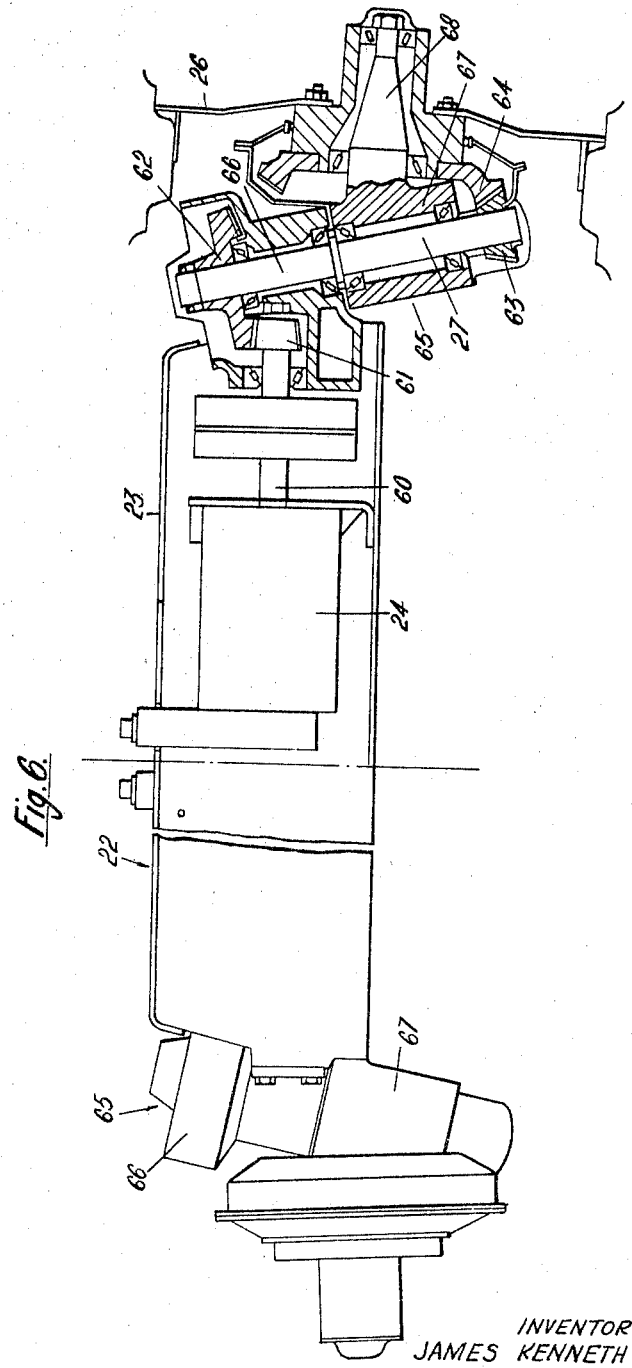

3,434,271
POWER UNIT AND FRAME
James K. Gaunt, Essendon, Victoria, Jacek J. Zagorski, Balwyn, Victoria, Alfred Player, Box Hill, Victoria, and Mintauts W. Fogels, Essendon, Victoria, Australia, assignors to Massey-Ferguson (Australia) Limited, Victoria, Australia
Filed Sept. 16, 1965, Ser. No. 487,776
Claims priority, application Great Britain, Sept. 28, 1964, 39,505/64
Int. Cl. A01d 45/10
U.S. Cl. 56—16                                                    1 Claim

ABSTRACT OF THE DISCLOSURE

A tall row crop harvesting machine having a wheel supported chassis unit and a harvesting unit including crop gathering, base cutting, and chopping means, the harvesting unit being partially supported on the chassis unit by means of parallel links that are telescopic to permit forward movement of the harvesting unit relative to the chassis unit to permit servicing of components in the machine.

---

The invention relates to machines for harvesting tall crops, such as sugar cane.

Previously proposed machines for the harvesting of tall row crops, particularly sugar cane, have included a topping device which removes the tops of the canes and a gathering unit which gathers the canes, after the tops have been removed, into a row of standing stalks which are then cut at or near ground level by a cutter. Thereafter the canes are fed into a chopping mechanism where they are cut into short lengths for ease of handling and the chopped canes are then conveyed clear of the machine.

Such previously proposed machines have been arranged as removable attachments mounted on the side of a tractor. This requires a fairly wide cleared space on which the tractor may run, so that it is impossible to open up a field with such machines, and they also require that adjacent rows of crop be harvested in the same direction of travel with consequent high percentage of idle time. The side mounted arrangement also produces a high degree of side draft and causes problems in travelling over irregular ground due to the presence of a fifth supporting wheel.

It is an object of the present invention to obviate or mitigate the above disadvantages.

The invention is a machine for harvesting tall crops including a harvesting unit and a chassis unit, the harvesting unit comprising crop gathering means, crop base cutting means, crop chopping means and crop delivery means arranged in sequence from front to rear of the machine, and the chassis unit straddling and providing adjustable support for the crop chopping means and including a pair of laterally-spaced longitudinal members extending alongside the harvesting unit and each supported at its forward end by a ground-engaging traction wheel, a rear section interconnecting the longitudinal members and having a mounting portion for a power unit adjacent one longitudinal member, and a steerable wheel assembly at the rear of the chassis unit.

The invention is also a steerable rear axle assembly for a wheeled vehicle including a hollow axle, a pair of hydraulic motors housed within the axle, and drive shafts extending laterally from each of said motors and connected to ground engaging wheels steerable on kingpin arrangements at opposite ends of the axle.

Preferably each kingpin is housed in a two-part housing having a first part secured to said axle and a second part, rotatable relative to said first part by a mechanical steering linkage, and secured to one of said ground-engaging wheels.

Preferably also the drive from each hydraulic motor to the associated ground-engaging wheel is effected through bevel gearing at the top and bottom of the respective kingpin.

Preferably also said axle assembly is pivotally connectible to the vehicle about an axis extending transversely of the axle assembly, that is longitudinally of the vehicle.

Preferably, said crop chopping means is supported on said chassis frame by an extensible linkage permitting the chassis frame to be moved rearwardly away from the crop chopping means to the maximum extent of said linkage to separate the two so that portions of said gathering means and crop chopping means which are normally rendered inaccessible by the straddling portions and longitudinal members of said chassis frame may be exposed for servicing.

An embodiment of the invention will now be described, by way of example only, with reference to the accompanying drawings, in which:

FIG. 1a is a diagrammatic, part sectional side view of the front portion of a sugar cane harvester;

FIG. 1b is a similar view of the rear portion of the machine shown in FIG. 1a;

FIG. 2a is a diagrammatic, part sectional plan view of the front portion of the machine;

FIG. 2b is a similar view of the rear portion of the machine;

FIG. 3 is a part sectional plan view to a larger scale of the front portion of the machine;

FIG. 4 is a similar view of the rear portion of the machine;

FIG. 5 is a part sectional side view of the front portion of the machine; and

FIG. 6 is a part sectional rear view of the rear axle assembly.

The machine shown in the drawings comprises two principal sections, namely a self-propelled chassis unit and an adjustably mounted harvesting unit. These are connected together by a linkage which permits the harvesting unit to be carried by the chassis unit at adjustable height and also permits the harvesting unit to be moved fore and aft relative to the chassis unit for service accessibility.

Referring to the drawings, the chassis unit includes a base structure 10 in the form of a forwardly opening U, the two legs 11 of which extend down opposite sides of the harvesting unit and are supported at their forward ends on power driven traction wheels 12. The rear portion of the U-frame 10 has mounting portions or platforms 13 and 14 at opposite corners one of which carries an engine 15 and the other of which carries a hydraulic pump assembly 16 and fuel and oil tanks 17. The U-frame 10 also carries upstanding members 18 and 19 interconnected at their upper ends so as to straddle the harvesting unit and provide supports for certain portions of the harvesting unit.

At its rear the chassis frame is provided with two central, longitudinally-aligned, ball-and-socket joints 20 and 21 between which extends a shaft carrying a steerable rear axle assembly 22. This assembly is a cruciform structure, the transverse member 23 of which is hollow and carries individual hydraulic motors 24 and 25 for the rear wheels 26. The latter are mounted on kingpins 27 and are steerable by a steering linkage 28.

Referring to FIG. 6, each rear wheel motor has a laterally extending output shaft 60 drivingly connected to the associated kingpin 27 by bevel gears 61 and 62. The lower end of the kingpin 27 is connected through bevel gears 63 and 64 to the associated rear wheel 26. To permit steering of the rear wheels 26, each kingpin 27 is supported in bearings in a two-part kingpin housing 65. The upper part 66 of the housing is secured to the hollow transverse member 23 and the lower part 67 is rotatable by the steering linkage 28 and carries a stub shaft 68 on which the rear wheel 26 is rotatably supported.

The chassis frame 10 also carries at its rear portion a gearbox 29 at the rear of the engine 15. The gearbox has a transverse output shaft 30 which supplies an accessory gearbox 31 driving a cluster of auxiliary hydraulic pumps and the like. The gearbox 29 also has a forwardly facing output shaft 32 supplying rotary power to the harvesting unit.

The harvesting unit includes an independently adjustable cane topping unit 33 mounted on an extensible and vertically swingable boom 34, a gathering unit 35, a base cutting and cane chopping unit 36 and a discharge elevator assembly, all arranged one behind the other. The gathering unit 35 is supported partly on the ground and partly on the base cutting and cane chopping unit 36. The base cutting and cane chopping unit includes a cutter 37 which cuts the base of the cane stalks at or near ground level and a pair of rotary chopping drums 38 which receive the cut cane stalks from a conveyor 39 and carry cooperating peripheral knives which chop the cane stalks into short lengths. The base cutting and cane chopping unit 36 is supported on the chassis frame 10 in a vertically adjustable manner by four parallel links 40 and 41 (FIGS. 3 to 5) which allow vertical motion of the unit 36 while maintaining its substantially horizontal. The telescoping links 40 and 41 are connected at their rear ends to members 18 and 19 and at their front ends to the base cutting and chopping unit 36 at 70 and 72. Telescopic members 74 are connected at their upper ends to member 18 and 19 and at their lower ends to unit 36. As members 74 are extended and contracted the unit 36 is moved up and down with the links 40 and 41 maintaining the unit 36 parallel to the ground.

Pivotally connected to and supported on the rear of the base cutting and cane chopping unit 36 is a first elevator 42, the rear end of which is carried on rollers 43 on an uptsanding frame member 44 (FIG. 1b). This permits longitudinal and slight angular movement of the first elevator 42. The discharge end of the first elevator 42 opens into a hopper 45 leading to the lower end of a second or discharge elevator 46 pivoted on a vertical shaft 47 for swinging movement between the position shown in full line in FIG. 2b and the two positions shown in broken lines. The discharge elevator is supported intermediate its ends by a suspension 48 rotatably connected to an upstanding circular flange 49 on top of the hopper 45.

A blower 50 blows air upwards through the hopper 45 to remove trash from among the cane falling from the first elevator 42 to the second elevator 46, the trash being blown clear of the machine through an opening 51 in the top of the hopper 45 defined by the flange 49. The discharge end of the elevator 46 is provided with an adjustable deflector 52 by means of which discharged cane may be guided into and evenly spread over a wagon or the like located directly behind or at either side of the rear end of the machine.

In addition to providing the hydraulic drive for the traction wheel 26 the accessory gearbox 31 provides power to operate a number of other hydraulic pumps, each supplying pressurized fluid for driving various hydraulic motors and cylinders which operate the various moving parts of the harvesting unit, not driven by the shaft 32. Suitable control valve (not shown) for governing these various circuits may be provided adjacent to the operator's platform.

In operation, as the machine moves along a row of cane, the tops of the canes are cut off by the topping unit 33 and the canes are then gathered by the gathering unit 35 into a row of standing stalks. The gathering unit 35 serves to erect any canes which are not standing substantially vertically. The canes are then cut at their base near the ground, and the butts are swung upwardly and rearwardly and fed into the chopping mechanism which chops the canes into the shorter sections and propels them rearwardly across an upwardly directed blast of air provided by a blower 53 onto the first elevator 42. From the delivery end of the first elevator 42 the cut canes fall vertically through another upwardly directed blast of air, provided for cleaning purposes by the blower 50, and drop on to the discharge elevator 46 which carries the canes clear of the machine either to the left, right or rear thereof, depending upon whether the unharvested canes are at the right or the left or on both sides of the machine.

Because of the open U-shape of the chassis frame, the harvesting unit as a whole is mounted at a low position capable of cutting canes at or near ground level, and reasonably close to the line connecting the points of ground contact of the two front wheels. In this way pitching movements of the chassis caused by passing over rises or depressions in the ground do not cause very great vertical displacement of the butt cutting mechanism.

The front traction wheels and associated frame portions obstruct access to the sides of the base cutting and cane chopping unit and would normally render servicing difficult. To overcome this, the links 40 and 41 are telescopic and are normally held against telescoping movement by detents or locking means such as pins 75. By removing the detents the chassis unit may be backed away from the harvesting unit to the extent permitted by the fully extended links 40 and 41 without completely disengaging the two units. This in effect removes the wheels and chassis frame from their obstructing position and enables such operations as removal of the top chopping drum 38 laterally outwards. Likewise easier access is given to other parts of the unit 36. When the service operations have been completed, the chassis unit is again driven forwardly fully collapsing the telescoping links 40 and 41 which are then detented in position and the unit is ready for operation.

The machine described is constructed such that the chassis unit and the harvesting unit have the minimum projection from either side of the machine. During normal operation all the parts are within the limits of the four ground wheels so that the machine may readily pass between rows of cane or either side of the row being harvested. Moreover the butt cutting mechanism is arranged to cut the canes adjacent to the line of ground contact of a pair of wheels of the chassis and to minimize vertical displacement of the butt cutting mechanism during operation over undulating ground.

It should be noted that while in the embodiment a cane harvester is described, the rear axle assembly may be applied to any wheeled vehicle.

We claim:

1. A machine for harvesting tall crops including a harvesting unit and a chassis unit, the harvesting unit comprising crop gathering means, crop base cutting means, crop chopping means and crop delivery means arranged in sequence from front to rear of the machine, and the chassis unit straddling and providing adjustable support for the crop chopping means and including a pair of laterally-spaced, longitudinal members extending alongside the harvesting unit and each supported at its forward end by a ground-engaging traction wheel, a rear section inter-connecting the longitudinal members and having a mounting portion for a power unit adjacent one longitudinal member, and a steerable wheel assembly at the rear of the chassis unit, said adjustable support including linkage means extending between said chassis unit and said harvesting unit and supporting the latter on the former in a vertically adjustable manner in a normal closely spaced fore and aft relationship with respect to each other, said linkage including extendable means permitting said harvesting unit to be extended forward of said chassis unit to a position substantially forward of the chassis unit whereby said harvesting unit is more readily exposed for service.

References Cited

UNITED STATES PATENTS

| | | | |
|---|---|---|---|
| 3,325,982 | 6/1967 | Fogels et al. | 56—56 |
| 2,648,943 | 8/1953 | Shafer et al. | 56—17 |
| 3,002,330 | 10/1961 | Thomson | 56—17 |
| 3,103,091 | 9/1963 | Duncan et al. | 56—16 |
| 3,141,281 | 7/1964 | Gaunt et al. | 56—16 |

ANTONIO F. GUIDA, *Primary Examiner.*